(12) United States Patent
Rodriguez (10) Patent No.: US 9,085,735 B2
(45) Date of Patent: Jul. 21, 2015

(54) METHODS FOR PRODUCING SYNTHETIC FUEL

(71) Applicant: American Fuel Producers, LLC, Ridgeland, MS (US)

(72) Inventor: Jose M. Rodriguez, Starkville, MS (US)

(73) Assignee: American Fuel Producers, LLC, Ridgeland, MS (US)

( * ) Notice: Subject to any disclaimer, the term of this patent is extended or adjusted under 35 U.S.C. 154(b) by 22 days.

(21) Appl. No.: 13/732,798

(22) Filed: Jan. 2, 2013

(65) Prior Publication Data

US 2014/0187830 A1    Jul. 3, 2014

(51) Int. Cl.
| C10G 1/10 | (2006.01) |
| B01J 23/745 | (2006.01) |
| C10L 1/04 | (2006.01) |
| C10G 1/08 | (2006.01) |
| C10L 1/06 | (2006.01) |
| C10L 1/08 | (2006.01) |

(52) U.S. Cl.
CPC . *C10G 1/086* (2013.01); *C10L 1/04* (2013.01); *C10L 1/06* (2013.01); *C10L 1/08* (2013.01); C10G 2300/1014 (2013.01); C10G 2400/02 (2013.01); C10G 2400/04 (2013.01); C10G 2400/06 (2013.01); C10G 2400/08 (2013.01)

(58) Field of Classification Search
CPC ............. C10L 1/04; C10L 1/08; C10G 1/00; C10G 1/10; C10G 57/00; C10G 57/02; C10G 2300/1003; C10G 2400/02; C10G 2400/04; C10G 2400/06; C10G 2400/08; C07C 4/00; C07C 4/22; B01J 23/70; B01J 23/74; B01J 23/745; B01J 37/0036

USPC ........................................ 585/240, 241, 242
See application file for complete search history.

(56) References Cited

U.S. PATENT DOCUMENTS

| 3,222,698 | A | 12/1965 | Levenson |
| 3,223,698 | A | 12/1965 | Oshima et al. |
| 4,052,292 | A | 10/1977 | Espenscheid et al. |
| 4,118,281 | A | 10/1978 | Yan |
| 4,145,188 | A | 3/1979 | Espenscheid et al. |
| 4,670,613 | A | 6/1987 | Ruyter et al. |
| 5,728,271 | A | 3/1998 | Piskorz et al. |
| 5,841,011 | A | 11/1998 | Hashimoto et al. |
| 8,151,848 | B2 * | 4/2012 | Negroni et al. ............... 152/525 |
| 2004/0002622 | A1 | 1/2004 | Gagnon |
| 2004/0123519 | A1 | 7/2004 | Shigehisa et al. |

(Continued)

FOREIGN PATENT DOCUMENTS

| CA | 1201080 | 2/1986 |
| CA | 2296049 | 7/2001 |

(Continued)

OTHER PUBLICATIONS

International Patent Application No. PCTUS2013026582, "International Search Report and Written Opinion", mailed Oct. 10, 2013, 10 pages.

(Continued)

*Primary Examiner* — In Suk Bullock
*Assistant Examiner* — Philip Louie
(74) *Attorney, Agent, or Firm* — Ballard Spahr LLP (57) ABSTRACT

Methods are disclosed for producing synthetic fuel from carbon-containing polymeric feedstock using a select catalyst mixture.

23 Claims, 4 Drawing Sheets

(56) References Cited

U.S. PATENT DOCUMENTS

| | | | |
|---|---|---|---|
| 2007/0261996 A1 | 11/2007 | Siekmann et al. | |
| 2008/0218037 A1 | 9/2008 | Adachi et al. | |
| 2008/0272030 A1* | 11/2008 | Boykin et al. | 208/121 |
| 2008/0274017 A1* | 11/2008 | Boykin et al. | 422/105 |
| 2008/0274022 A1* | 11/2008 | Boykin et al. | 422/199 |
| 2008/0295390 A1 | 12/2008 | Boykin et al. | |
| 2008/0299021 A1* | 12/2008 | Boykin et al. | 422/213 |
| 2009/0139851 A1 | 6/2009 | Freel | |
| 2009/0223859 A1 | 9/2009 | Buchert | |
| 2009/0299112 A1 | 12/2009 | Bauer et al. | |
| 2010/0105970 A1 | 4/2010 | Yanik et al. | |
| 2010/0137665 A1 | 6/2010 | Chen | |
| 2010/0162619 A1 | 7/2010 | Peus | |
| 2010/0190973 A1 | 7/2010 | Srivastava et al. | |
| 2010/0192457 A1 | 8/2010 | Tsurutani et al. | |
| 2010/0209965 A1 | 8/2010 | O'Connor et al. | |
| 2010/0228062 A1 | 9/2010 | Babicki et al. | |
| 2010/0293838 A1 | 11/2010 | O'Connor | |
| 2011/0094147 A1 | 4/2011 | Bartek et al. | |
| 2011/0144396 A1 | 6/2011 | Lotero et al. | |
| 2011/0197496 A1 | 8/2011 | O'Connor et al. | |
| 2011/0223643 A1 | 9/2011 | Sun et al. | |
| 2011/0239620 A1 | 10/2011 | Pashkin | |
| 2012/0005949 A1 | 1/2012 | Stevens et al. | |
| 2012/0022307 A1 | 1/2012 | Yanik et al. | |
| 2012/0094879 A1 | 4/2012 | Roberts et al. | |
| 2012/0096762 A1 | 4/2012 | Oldenburg et al. | |
| 2012/0101319 A1 | 4/2012 | Roberts et al. | |
| 2012/0130141 A1 | 5/2012 | Oldenburg et al. | |
| 2012/0151827 A1 | 6/2012 | Powell et al. | |
| 2012/0152836 A1 | 6/2012 | Powell et al. | |
| 2012/0156742 A1 | 6/2012 | Powell et al. | |
| 2012/0156743 A1 | 6/2012 | Powell et al. | |
| 2012/0157730 A1 | 6/2012 | Powell et al. | |
| 2012/0280175 A1 | 11/2012 | Kania et al. | |
| 2012/0289752 A1 | 11/2012 | Gosselink et al. | |

FOREIGN PATENT DOCUMENTS

| | | |
|---|---|---|
| CN | 101402659 | 4/2009 |
| GB | 466336 | 5/1937 |
| JP | 61225280 | 10/1986 |
| JP | 02102295 | 4/1990 |
| JP | 2001129405 | 5/2001 |
| JP | 2006063310 | 3/2006 |
| JP | 2010184965 | 8/2010 |
| KR | 1020120103795 | 9/2012 |
| WO | 2008137469 | 11/2008 |
| WO | 2008137473 | 11/2008 |
| WO | 2010033512 | 3/2010 |
| WO | 2011123897 | 10/2011 |
| WO | 2012092644 | 7/2012 |
| WO | 2012118730 | 9/2012 |

OTHER PUBLICATIONS

Diesel Fuel No. 2, IPCS (International Programme on Chemical Society), ICSC 1561, http://www.inchem.org/documents/icsc/icsc/eics1561.htm, Oct. 2004 (2 pages).

* cited by examiner

METHODS FOR PRODUCING SYNTHETIC FUEL

FIELD OF THE INVENTION

The present invention generally relates to methods for producing synthetic fuels. More particularly, it relates to methods for producing synthetic fuels from carbon-containing polymeric feedstock.

BACKGROUND OF THE INVENTION

Wood and coal have been a principle source of fuel for hundreds of years. In modern times, petroleum has become a primary commodity for the generation of energy. Petroleum has had the advantages of relatively low cost and ease of transportation and storage because of its liquid consistency. Further, petroleum is readily amenable to fractionation and conversion into a variety of valuable industrial products such as fuels, building products, chemical intermediates, and the like.

International political developments have led to increase in the price of crude oil. The consumption of petroleum has been increasing exponentially and concomitantly the readily available world petroleum supply has diminished. Governments and industrial concerns are dedicating increased attention to alternatives to petroleum as sources for fuels and chemical intermediates.

In recent years, the world has seen many innovations in "green" technologies, including methods for making synthetic fuels for transportation and heat utilizing the enzymatic and bacterial decomposition of cellulose and starch material to ethanol or similar alkanol products. Vegetable oils of many varied plant sources have been converted to alkyl esters. Although these processes are clean and environmental friendly and can provide an alternative source of synthetic fuel, the use of edible plants may lead to the increase of prices in the food supply. Moreover, some of these plants require high energy costs during the planting, harvesting, and processing phases.

New programs are being developed for the provision of carbonaceous fuel products that complement and enhance conventional petroleum or coal-derived energy sources. Processes for liquefying coal or the gasification and then condensation of other carbon-containing materials have been proposed. However, these processes have not been deemed to be fully satisfactory for various cost or environmental reasons. Thus, there remains a pressing need for new technology that can deliver high quality fuels at economically and environmentally favorable levels, while maintaining atmospheric carbon neutrality. The methods of the present invention are directed toward these, as well as other, important ends.

SUMMARY OF THE INVENTION

Generally speaking, in accordance with the invention, methods for producing synthetic fuels, especially those that are essentially chemically identical to conventional vehicle fuels, are provided in which a feedstock containing polymers from a wide variety of sources is re-formed into a more satisfactory fuel source for producing heat, electricity, powering vehicles and the like. The feedstock can comprise scrap rubber, plastic and/or organic matter or other materials that are not particularly well suited for use as fuels in their existing state. The methods can involve breaking relatively long polymer hydrocarbon and/or carbohydrate polymer molecules into shorter chain hydrocarbon radicals and then polymerizing the short chain hydrocarbons and forming a fuel comprising hydrocarbons of selected length. Reactions in accordance with preferred embodiments of the invention do not involve adding oxygen to the system and can be considered anaerobic. Reactions in accordance with preferred embodiments of the invention involve much less water than many conventional methods and can be considered relatively anhydrous.

In one aspect, the invention is directed to methods for producing synthetic fuel, comprising:
preparing a slurry comprising:
carbon-containing polymeric feedstock;
a catalytic amount of a catalyst mixture comprising:
elemental iron; and
$Fe_2O_3$;
a carrier liquid;
heating said slurry to a temperature of about 20° C. to about 550° C. under a pressure of about 5 kPa to about 10,500 kPa for a time sufficient to produce a gaseous phase and a liquid phase; and
condensing said gaseous phase to produce said synthetic fuel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

As employed above and throughout the disclosure, the following terms, unless otherwise indicated, shall be understood to have the following meanings.

As used herein, the singular forms "a," "an," and "the" include the plural reference unless the context clearly indicates otherwise.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading may be combined with embodiments illustrated under any other heading.

The use of numerical values in the various quantitative values specified in this application, unless expressly indicated otherwise, are stated as approximations as though the minimum and maximum values within the stated ranges were both preceded by the word "about." In this manner, slight variations from a stated value can be used to achieve substantially the same results as the stated value. Also, the disclosure of ranges is intended as a continuous range including every value between the minimum and maximum values recited as well as any ranges that can be formed by such values. Also disclosed herein are any and all ratios (and ranges of any such ratios) that can be formed by dividing a recited numeric value into any other recited numeric value. Accordingly, the skilled person will appreciate that many such ratios, ranges, and ranges of ratios can be unambiguously derived from the numerical values presented herein and in all instances such ratios, ranges, and ranges of ratios represent various embodiments of the present invention.

As used herein, "carbon containing polymeric material" refers to plant and non-plant based polymeric materials and mixtures thereof. Plant based polymeric materials include but are not limited to plant biomass containing cellulose, hemicellulose, and lignin from a variety of sources, including, without limitation (1) agricultural residues (including corn stover and sugarcane bagasse), (2) dedicated energy crops, (3) wood residues (including sawmill and paper mill discards), (4) municipal waste, and (5) industrial waste, and their constituent parts including without limitation, lignocellulose biomass itself, lignin, $C_6$ saccharides (including cellulose, cellobiose, $C_6$ oligosaccharides, $C_6$ monosaccharides, and $C_5$ saccharides (including hemicellulose, $C_5$ oligosaccharides, and $C_5$ monosaccharides). The non-plant based polymeric materials includes rubber and plastic materials, especially waste rubber and plastic, including but not limited to polystyrene, polyester, polyacrylate, polyurethane, polyethylene, polypropylene, and rubber, such as is present in vehicle tires. Mixtures of synthetic polymers with cellulosic materials and other plant based materials are also within the definition of carbon-containing polymeric materials.

As discussed herein, methods are provided for converting a carbon-containing polymeric feedstock into a synthetic fuel such as a synthetic form of gasoline, diesel, kerosene, home heating fuel, and/or aviation fuel. The polymeric raw material is depolymerized to low molecular weight intermediates and then re-combined to a predetermined, controlled molecular weight mixture of carbon-containing species, which is similar to the molecular structures of gasoline, diesel or other fuel.

The methods of the invention combines pressure, heat and select chemical catalysts. Specifically, the process combines the following general steps: (i) size reduction step of the feedstock materials; (ii) liquefaction reactor step that reduces the feedstock to short chain monomers; (iii) second stage processing step that recombines the monomers into synthetic gasoline (based on a 5-12 carbon chain molecule), diesel fuel (based on a 8-22 carbon chain molecule), kerosene (based on a 6-16 carbon chain molecule), jet/aviation fuel (based on a 6-22 carbon chain molecule), or other fuel; and (iv) transfer and storage of the final products.

The methods of the invention can be highly environmentally friendly. The methods can be anaerobic and anhydrous (non-aqueous carrier liquid) that create negligible amounts of carbon dioxide, a major by-product of many competing processes, and the anhydrous process generates no wastewater.

Fuels produced by the methods of this invention can have boiling points of about 30° F. to about 3000° F., room temperature viscosities of about 1 to about 200 cps and are suitable for a variety of uses.

Accordingly, in one embodiment, the invention is directed to methods for producing synthetic fuel, comprising:
preparing a slurry comprising:
carbon-containing polymeric feedstock;
a catalytic amount of a catalyst mixture comprising:
elemental iron; and
$Fe_2O_3$;
a carrier liquid;

heating said slurry to a temperature of about 20° C. to about 550° C. under a pressure of about 5 kPa to about 10,500 kPa for a time sufficient to produce a gaseous phase and a liquid phase; and
condensing said gaseous phase to produce said synthetic fuel.

While not wishing to be bound by theory, it is believed that the catalyst mixture reacts with the carbon-containing polymeric material through the following series of reactions to produce the hydrocarbon fuel:

In certain preferred embodiments, the method further comprises:
recycling said catalyst mixture by recovering said catalyst mixture from said liquid phase and adding additional elemental iron to said catalyst mixture.

In certain preferred embodiments, the method further comprises:
recycling said carrier liquid by recovering said carrier liquid from said liquid phase.

In certain preferred embodiments, the method further comprises:
separating said gaseous phase from said liquid phase prior to said condensing step.

In certain preferred embodiments, said heating comprises heating to at least two different temperatures.

In certain preferred embodiments, said temperature is about 40° C. to about 325° C., preferably about 110° C. to about 265° C.

In certain preferred embodiments, said pressure is about 3250 kPa to about 10,500 kPa, preferably about 4000 kPa to about 4250 kPa. In certain preferred embodiments, said pressure is applied using at least one screw press.

In certain preferred embodiments, said carbon-containing polymeric feedstock is lignocellulosic biomass. In certain preferred embodiments, said carbon-containing polymeric feedstock is a material selected from the group consisting of wood chips, wood fiber, sawdust, grass, hay, paper, cardboard, switch grass, agricultural waste, and mixtures thereof.

In certain preferred embodiments, said elemental iron and said $Fe_2O_3$ are present in a weight ratio of about 90:10 to about 50:50, preferably about 70:30.

In certain preferred embodiments, said carbon-containing polymeric feedstock and said catalyst mixture are present at a weight ratio of about 5:1 to about 200:1, preferably about 20:1 to about 200:1.

In certain preferred embodiments, said carrier liquid is a liquid selected from the group consisting of diesel, gasoline, jet fuel, and mixtures thereof, preferably diesel.

In certain preferred embodiments, said synthetic fuel comprises one carbon atom to about 20 carbon atoms per molecule.

In certain preferred embodiments, said catalyst mixture has a mean particle size of less than about 0.2 mm.

In certain preferred embodiments, said carbon-containing polymeric feedstock has a mean particle size of less than about 5 mm, preferably less than about 1 mm, more preferably less than about 0.1 mm.

In certain preferred embodiments, said carbon-containing polymeric feedstock is present at a level of about 10% by weight to about 50% by weight, based on the total weight of said slurry, preferably about 30% by weight to about 35% by weight, based on the total weight of said slurry.

Figure 1:
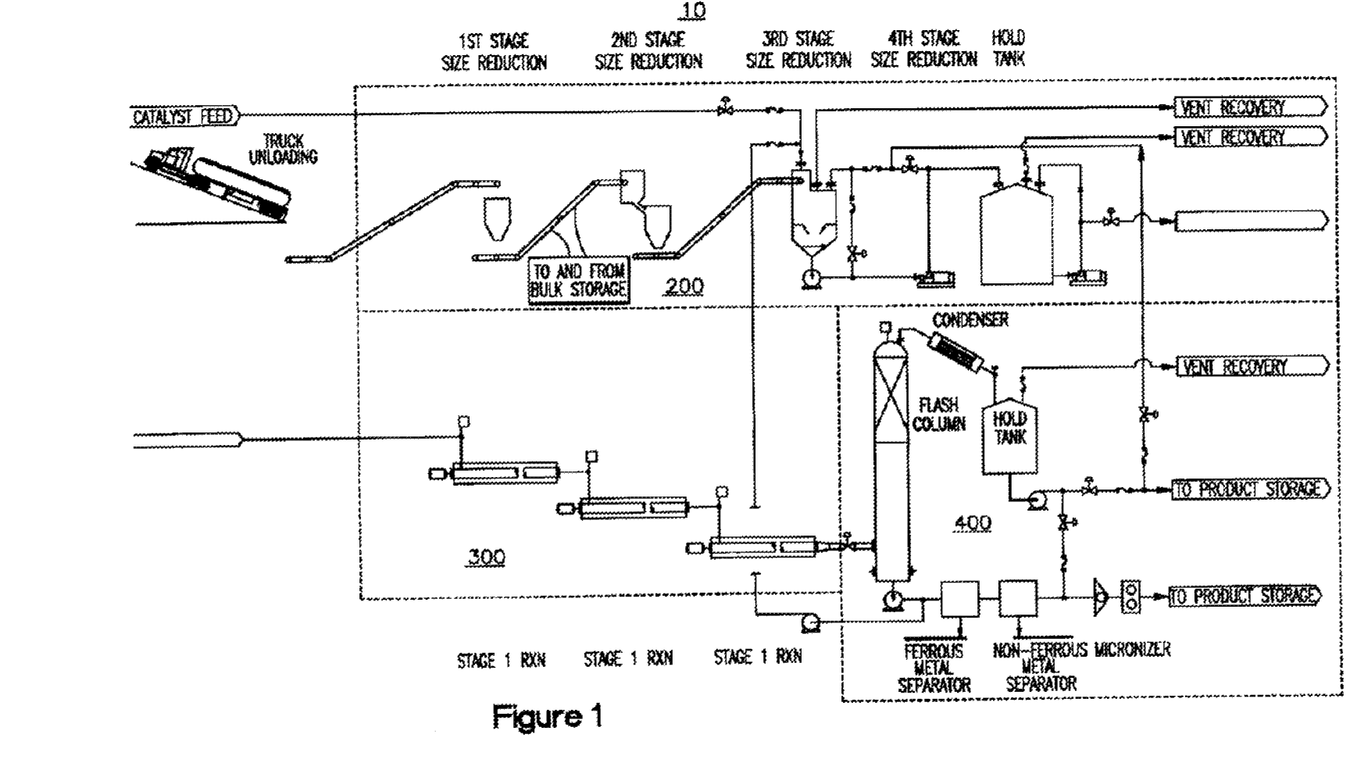
FIG. 1 is a schematic diagram of a process for producing synthetic fuels, in accordance with preferred embodiments of the invention.

One embodiment of the method of the invention is schematically shown in FIG. 1, a schematic view of a fuel production method (10) in accordance with a preferred embodiment of the invention. The method (10) comprises three general process steps: a size reduction step (200), a reaction step (300) and a finishing step (400), each shown in greater detail in FIGS. 2, 3, and 4, respectively.

One preferred embodiment of the invention utilizes a size reduction step having multiple stages to reduce, preferably gradually, the size of the carbon-containing polymer feedstock to the desired particle size. It is preferred that the feedstock be present in the slurry in particulate form at a particle size of about 5 mm in the longest dimension or less, preferably less than about 1 mm in the largest dimension, more preferably less than about 0.5 mm and most preferably less than about 0.1 mm. This size reduction can be done in multiple stages with the final reductions in size preferably carried out with the feedstock as a solid component dispersed in an organic liquid carrier that is a hydrocarbon/oxyhydrocarbon composition to form a slurry.

Figure 2:
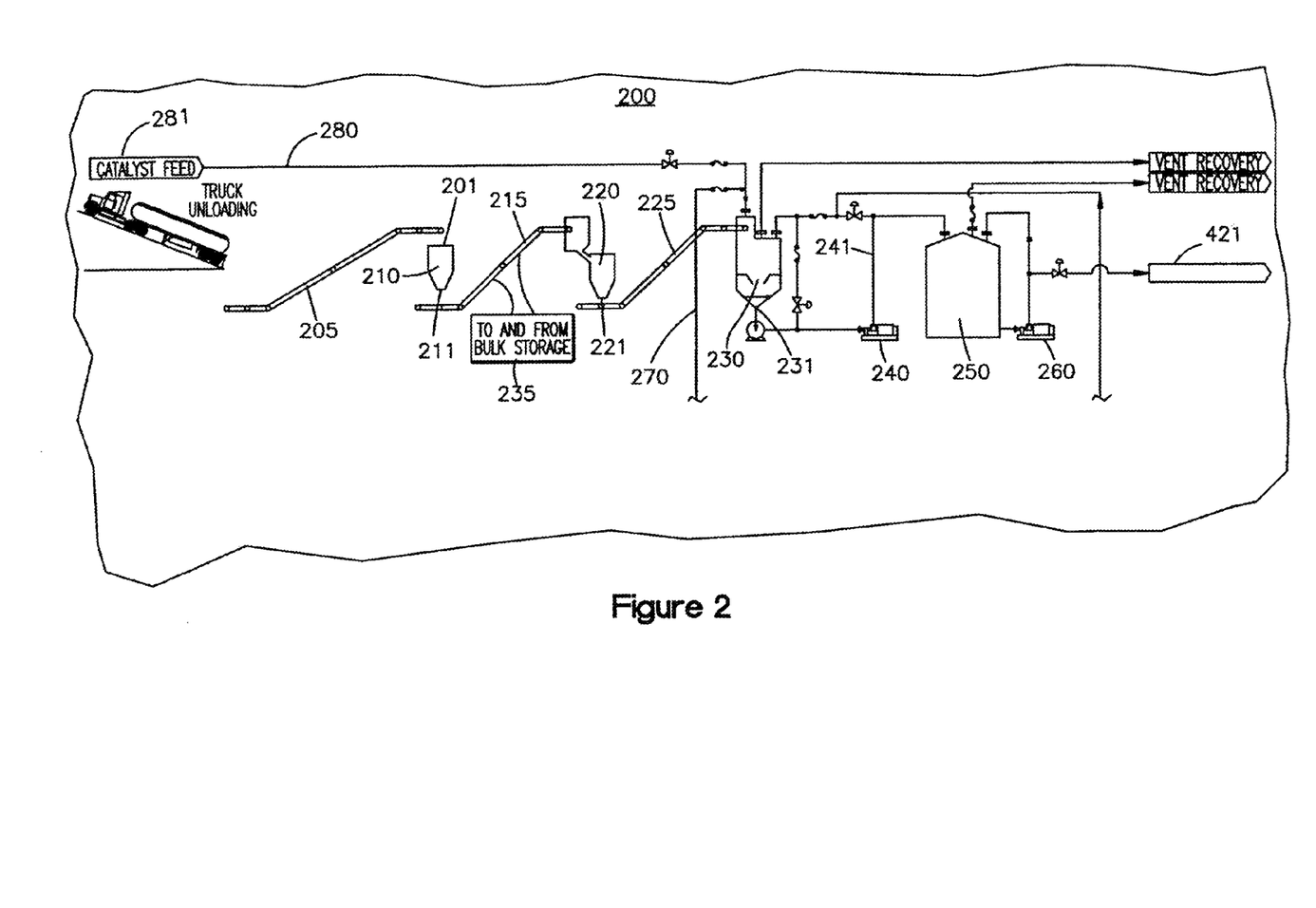
FIG. 2 is a schematic diagram of a size reduction step of the method of FIG. 1.

Referring to FIG. 2, size reduction section (200) preferably comprises a first stage size reduction grinder (210), a second stage size reduction grinder (220), a third stage size reduction grinder (230), a fourth stage size reduction safety grinder (240) and a slurry storage tank (250). Acceptable grinders in accordance with preferred embodiments of the invention include the MultiShear and Arde Barinco brand grinders, from MultiShear Corporation of Graniteville, S.C. and Arde Barinco, Inc. of Norwood, N.J.

A size reduction process can begin when a truck or other vehicle delivers a variety of feedstock to the method (10) or when the materials are reduced in size off site. A feedstock (201) is placed on a first conveyor belt (205), which carries the feedstock upon unloading to first stage size reduction grinder (210). The output of first stage size reduction grinder (210) is placed on a second conveyor belt (215), which carries once-reduced feedstock (211) to second stage size reduction grinder (220). Similarly, the twice-reduced output (221) of second stage size reduction grinder (220) is placed on a third conveyor belt (225) and transported to third stage size reduction grinder (230). Optionally, a storage tank, such as tank (235), may be added to store once-reduced output (211) of first stage size reduction grinder (210) or twice-reduced output (221) of second stage size reduction grinder (220). The three times reduced output (231) from third stage size reduction grinder (230) may be fed into fourth stage size reduction safety grinder (240) to insure substantially complete size reduction before a slurry output (241) is being stored in slurry storage tank (250). Alternatively, output (231) can be stored in slurry storage tank (250) without being fed into fourth stage size reduction safety grinder (240). Safety grinder (240) is optionally attached to slurry storage tank (250) to ensure uniformity of particles of less than about 0.5 mm, preferably less than about 0.1 mm, before the slurry enters the reaction section (300).

One purpose of the size reduction process of section (200) is to decrease the size of the feedstock pieces, preferably gradually, to desirable sizes, preferably less than about 0.5 mm, more preferably less than about 0.1 mm. In one embodiment, the feedstock is first ground to ½ inch to 1 inch pieces in first stage size reduction grinder (210), then to ⅛ inch to ⅜ inch size particles in second stage size reduction grinder (220) before entering third stage size reduction grinder (230). Both first second stage reduction grinder (210) and second stage reduction grinder (220) can be operated while the feedstock remains dry. In contrast, twice-reduced feedstock (221) is preferably combined with liquid to form a slurry form when it enters third stage grinder (230) and fourth stage safety grinder (240).

A contemplated feedstock can include naturally occurring biomass that contains one or both of lignin and polysaccharide materials such as cellulose and hemicellulose polymers, as well as chemically modified polysaccharides such as methyl cellulose, cellulose acetate, rayon and the like (collectively referred to herein as cellulosic material). These sources can further include various biomass sources, including wood chips, sawdust, brush, hay, straw, switch grass, corn stalks, kudzu and other sources of cellulosic material such as paper and cardboard, and mixtures thereof.

The sources of carbon-containing polymeric material can be permitted to dry or can be actively dried to a selected moisture content. Those carbon-containing polymeric material sources can also be blended to result in a desired moisture content. If necessary, water can be added to overly dry feedstocks. Sources of cellulosic material and lignin can be blended with each other and with other polymer feedstocks, or used as a single uniform type of cellulose.

The method may also utilize a synthetic polymer as the feedstock carbon-containing polymeric material. The synthetic polymer can be a hydrocarbon or other polymer. For example, waste plastic such as polystyrene, polyester, polyacrylate, polyurethane, polyethylene, polypropylene and rubber, such as is present in vehicle tires can be utilized as a feedstock source. Mixtures of synthetic polymers with cellulosic material are also acceptable for use as the feedstock. Tires can include all of the polymers now used to manufacture tires, such as butadienes and fillers, such as carbon, silica, aluminum and zinc acetate.

A wide variety of synthetic carbon-containing synthetic polymer or cellulosic polymer materials, including rubber, plastic, trees, bushes, brush, bark, sawdust, wood chips, hay, straw, switch grass, field stubble, paper, cardboard and the like can be used as feedstock in accordance with the invention. However, certain materials require additional attention. For instance, bark can be used. However, because bark is high in ash and absorbs water readily, when using bark as feedstock, special attention needs to be paid to insure moisture content.

The moisture content of the feedstock is of import to a contemplated method. The moisture content of the feedstock may be controlled and adjusted before or after the feedstock enters the first stage size reduction grinder (210) or second stage size reduction grinder (220). Feedstock of various moisture contents may be blended to achieve desirable average moisture content. If necessary, additional water can be sprayed or otherwise added into the system. Feedstock such as grasses, brush and wood chips may be permitted to dry before entering a process in accordance with the invention. Regardless of when the feedstock is dried or moistened, the average water content is preferably about 1 to about 25%, more preferably about 10 to about 20% and most preferably about 15 to about 17% by weight of the feedstock.

In accordance with embodiments of the invention shown in FIG. 2, the third stage grinder (230) may be constructed and arranged to receive output (221) from the second stage grinder (220) and, in addition, two additional feeds, including a liquid feed (270) and an initiator feed (280). All the inputs to third stage grinder (230) are mixed to form a slurry (231) having the above-identified water content.

The input from liquid feed (270) advantageously comprises a non-aqueous hydrocarbon/oxyhydrocarbon solvent (271). In one preferred embodiment of the invention, the hydrocarbon/oxyhydrocarbon solvent may be final output (421) of the method (10). However, it is not necessary to use a recycle of the final product, and other hydrocarbon/oxyhydrocarbon solvents may be used. Liquid feed (270) advantageously changes the viscosity of slurry (231). The addition of hydrocarbon solvent or carrier liquid (271) fills out the available space in reactors discussed below to ensure an oxygen free environment. The liquid phase also makes size reduction easier.

A particularly useful and relatively low cost hydrocarbon/oxyhydrocarbon solvent is No. 2 diesel fuel. No. 2 diesel fuel is typically petroleum-derived and is composed of about 75% saturated hydrocarbons (primarily paraffins including n, iso, and cycloparaffins), and 25% aromatic hydrocarbons (including naphthalenes and alkylbenzenes). The average chemical formula for a molecule of common diesel fuel is $C_{12}H_{23}$. No. 2 diesel fuel is a mixture of hydrocarbons that typically correspond to the formula approximately $C_{10}H_{20}$ to $C_{15}H_{28}$. No. 2 diesel fuel typically has a boiling point of about 285° C. to about 340° C. (at one atmosphere), a melting point of about −30° C. to about −18° C., and a density of about 0.87 to about 0.95 g/cm$^3$. Characteristics of No. 2 diesel are described in IPCS (International Programme on Chemical Safety) document 1564, October 2004.

Synthetic diesel produced from the Fischer-Tropsch process is also useful as the carrier liquid. Synthetic diesel can also be produced from natural gas in the gas-to-liquid (GTL) process or from coal in the coal-to-liquid (CTL) process. Such synthetic diesel has about 30% less particulate emissions than conventional diesel. No. 2 fuel oil and No. 2 diesel are substantially the same and have a flash point of 52° C.

The carrier liquid should, however, while mostly comprising organic solvent, contain controlled amounts of water. The water can act as a source of hydrogen for aiding the reduction of molecular size. Water content is preferably about 25% to about 5%, more preferably about 15% to about 20%, and most preferably about 16% to about 17% of the feedstock.

Initiator feed (280) introduces the catalyst mixture particles (281) to the input of third stage grinder (230). The catalyst mixture is a mixture of elemental iron and $Fe_2O_3$. The catalyst mixture can be provided as a metal powder with substantially all, but at least 80% of the particles having a diameter (or largest dimension) of less than about 1000 microns (passes through a No. 18 Standard Sieve), preferably less than about 500 microns (passes through a No. 35 Standard Sieve), more preferably about 300 microns (passes through a No. 50 Standard Sieve) or less, and even more preferably less than about 200 microns.

The components of the catalyst mixture, i.e., elemental iron and $Fe_2O_3$, can be provided as pure metal powders. Alternatively, polymeric materials, such as used tires, can be used to provide the components, especially the elemental iron.

A preferred source of the metal catalyst comes from ground up tires, e.g., tires used on an automobile, truck, aircraft, construction equipment, military vehicle and the like. Conventional automobile tires include steel belts. These belts are commonly formed from iron-containing wire that is coated with copper, which in turn, can be coated with zinc. A steel-belted tire typically contains about 20 to about 25% by weight iron, and that amount can be used in determining the amount of initiator/catalyst present at the beginning of a reaction. The steel belts in tires contain iron that can be coated with copper and/or zinc.

In a preferred embodiment of the invention, essentially all, but at least 80% of the tires are ground into smaller pieces, preferably in multiple stages, to a size less than about 1,000 microns, more preferably less than about 300 microns and most preferably about 500 microns or less. This size reduction results in the production of metal particles in the above sizes. The final size reductions advantageously take place in a slurry.

The process described herein can use automobile, tractor and truck tires or general plastic polymer waste as sources of plastic, carbon, iron and copper. The plastic polymers of butadiene, styrene/butadiene, Buna N, Neoprene, polyesters, polyurethanes and others depending on the manufacturers polymer blend can be depolymerized and serve as sources of carbon-containing polymer radicals to form iso, secondary, and other polymers with the intermediate unsaturated polymers formed from cellulose. Halogen-containing polymers, sulfur-containing polymers and nitrogen-containing polymers are preferably not used as part of the feedstock. The polymeric materials of the feedstock are substantially free of halogen, sulfur and nitrogen atoms and can contain up to about 10% by weight, based on the total weight of all of those atoms when calculated together. Preferably, the total weight percentage of all of the halogen, sulfur and nitrogen atoms in the polymeric feedstock is less than about 5%. The metals can react with the water and cellulose to remove oxygen and form in situ hydrogen. The metal oxides can be removed from the process slurry and sold as a by-product. Tires and plastics can be used as 100% of the raw material or some lesser percentage. The presence of the tires and plastics reduce the amount of catalysts and carbon needed for the method.

Catalyst mixture (281) is added to the third stage grinder (230). Regardless of the source of catalyst mixture (281), it should have a particle size less than about 1000 microns, preferably less than 500 microns and more preferably about 300 microns or less and even more preferably less than about 200 microns. The smaller size can lead to a more optimal reaction rate because of the increased surface area. Catalyst mixture (281) is present in an catalytic amount that typically comprises more than 1% by weight of feedstock (201), preferably more than 3% and most preferably 5% or more preferably up to about 10% by weight of feedstock.

Figure 3:
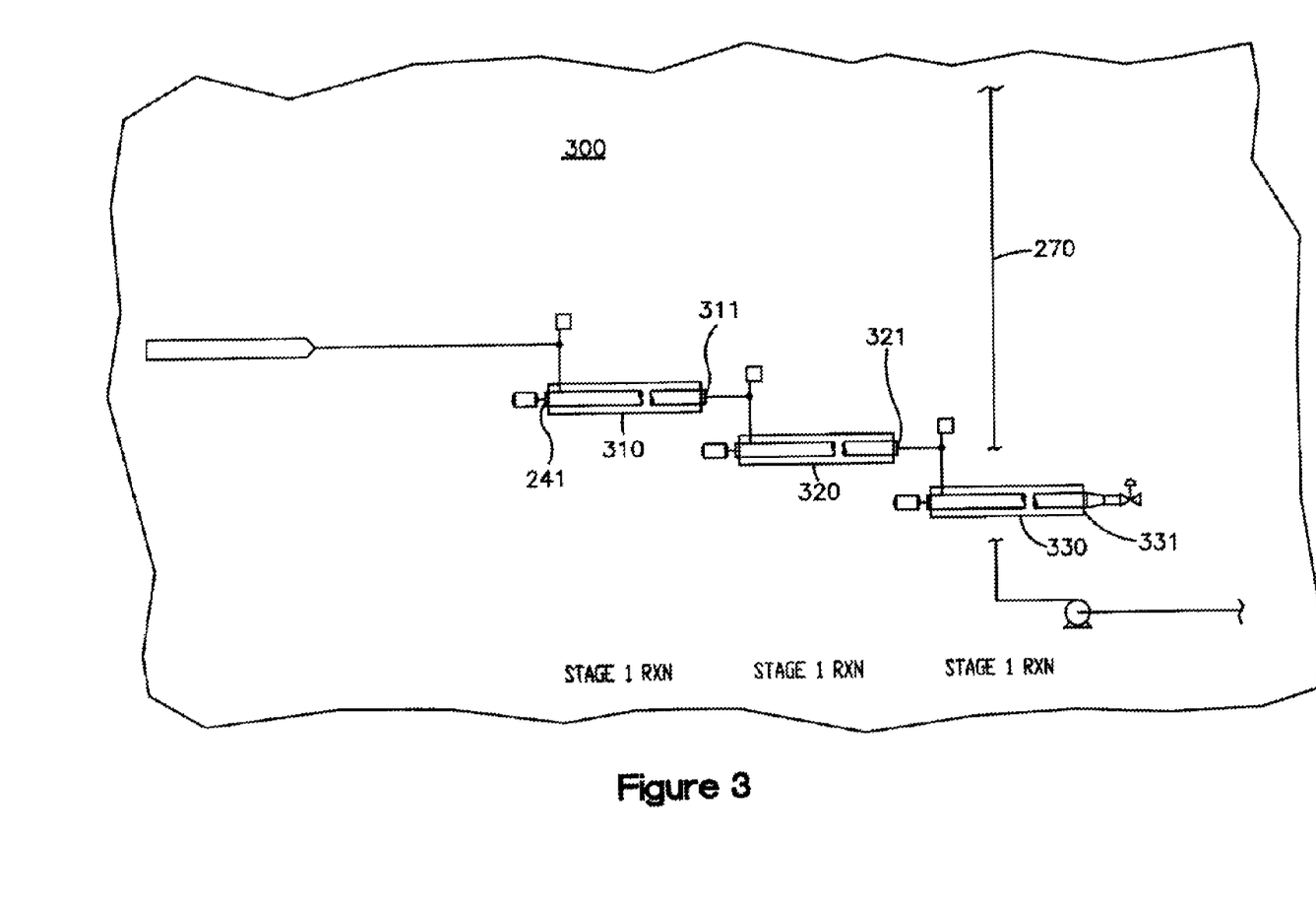
FIG. 3 is a schematic diagram of a reaction step of the method of FIG. 1.

Once feedstock (201) has undergone size reduction, the slurry output (231) is fed into slurry storage tank (250). The slurry output (231) may then be utilized in a chemical reaction process in reaction section (300).

Preferred embodiments of the invention comprise a reaction step (300). Preferred processes can involve multiple reaction stages in multiple reactors (2, 3, 4, 5, 6, 7, 8, 9, or more) to break down feedstock into short chain carbon radicals. Those radicals, preferably 2- through 9-carbon chains, e.g., 2-, 3-, 4-, 5-, 6-, 7-, 8- and 9-carbon chains, repolymerize to form a liquid, burnable synthetic fuel as a final output (421) of the method (10). Such fuels may be prepared to be identical to conventional vehicle fuels refined from crude oil.

Referring to FIG. 3, the reaction section (300) preferably comprises a first reactor (310), a second reactor (320) and a third reactor (330) linked in series. Optional systems and methods can involve fewer or more reactors. Each reactor is preferably in the form of a horizontal tube. Preferred sizes are about 30 feet in length with a 2.5 foot inside diameter (about 12:1 length:diameter). Lengths and diameters (widths) of the reactors vary depending on plant production capacity. However, a length to diameter ratio of about 5:1 to about 20:1 is acceptable with about 10:1 to 15:1 being preferred. An internal screw (auger) may be used to move the reactants in plug-flow, through the reactor at controlled speeds. The screw is of a variable speed so that time of plug flow through the reactor may be adjusted despite changes in flow volume and reaction rates.

Electrical heating elements on the reactor surfaces advantageously control the temperature inside the reactors, permitting a gradual and uniform rise in temperature across the length of the reactor, while minimizing fire hazard from an open flame. Superheated steam and open flames can also be used to heat the reactor. Viscosity is generally proportional to molecular size. Thus, viscosity measurements are advantageously taken at the output of each reactor and analyzed, in order to adjust the heating elements and screw speed, to provide the optimal reaction time, temperature and pressure. Temperature can be measured at the input, output and at intermediate points. The viscosity measurements can be used to affect the heating elements and screw speeds to adjust residence times and reactor temperature as needed. The reactants can spend between about 10 to 15 minutes, preferably a residence time of about 11 to 13 minutes in each reactor.

Each reactor may be sealed off from the atmosphere and pressurized to ensure an anaerobic reaction with no added atmospheric oxygen. In addition, each reactor may be adapted to contain a flammable liquid at a temperature of over 455° C. and at a gauge pressure of about 5,500 kPa. However, the pressure in each reactor need not be specifically controlled. Rather, pressure can be the result of the increase in temperature. Because of the lack of oxygen and the ability to control surface temperature of the reactors, there is relatively negligible char build-up after reactions to require extensive and frequent cleaning. In addition, the auger tends to provide a constant cleaning function.

The goal of the first reactor (310) and second reactor (320) is to liquefy and break down the feedstock polymers to short chain molecules, including monomers and monomer radicals. In one embodiment of the invention, to begin reaction, slurry output (241) is heated to about 250° F. (120° C.) at a gauge pressure of about 690 kPa (100 psig) and fed into first reactor (310). The temperature increase can be achieved in various ways, preferably by recycling hot liquid or slurry streams from other parts of the method (10). While in the first reactor (310), the temperature of the reactants continues to rise, resulting in a liquefied output (311) with the temperature about 450-500° F. (230-260° C.) at a gauge pressure of about 3,500 kPa (500 psig). During the residence time in the first reactor (310), various solids of slurry output (241) are liquefied by the reactions at increasing temperature and pressure. Speed and temperature are preferably adjusted so that no more than a trace of non-liquid material leaves the first reactor (310).

The second reactor (320) is constructed and set up in a similar manner as the first reactor (310). Liquefied output (311) from first reactor (310) enters second reactor (320) at a temperature of about 450° F. (230° C.) and a gauge pressure of about 3,500 kPa (500 psig). Generally, unlike the endothermic reaction in first reactor (310), because the reaction in second reactor (320) is typically exothermic, no additional heat is typically needed except for the purpose of maintaining constant temperature and controlling reaction rate.

It is believed that while in first reactor (310), as the temperature increases from about 250° F. (120° C.) to 450° F. (230° C.), the catalyst mixture (281) begins to react with available water in the feedstock to become oxidized by freeing hydrogen in water, creating free hydrogen. The free hydrogen, along with high temperature and pressure, liquefies solids in slurry output (241) by attacking the bonds in hydrocarbon polymers and in cellulosic materials to make shorter chain molecules and promote the liquefaction of the feed stream. About 50-70% of the breakdown of plastic and cellulosic materials to short chain molecules can occur in the first reactor (310).

Reforming:

$n_1 \sim 2200, n_2 \sim 1,2$

Once liquefied output (311) enters the second reactor (320), components are believed to continue to be broken down into short molecular links and further into intermediates through the process of dehydration on the surface of the particulate initiator (281). The length of carbon chains can be altered and controlled by changing the temperature, reactor residence time, and amounts of initiator mixture (281) added.

The hydrogen created in the reactor (310) is believed to react with intermediates to saturate double bonds to form alkyl hydrocarbon radicals. These hydrocarbon radicals, preferably 2-, 3-, 4-, 5-, 6-, 7-, 8- and 9-carbon chains are believed to be weakly bonded to the surface of catalyst mixture (281) with unsaturated double bonds, readily available for polymerization while the oxygen from the hydroxyl groups continues to oxidize the catalyst mixture (281). Some oxygen reacts with free hydrogen to form water. Some traces of alcohols, such as ethanol and methanol, are also formed.

Dehydration:

-continued

The series of reformation, dehydration and hydrogenation are self-activating because of the derivative intermediates formed. As long as the surface area of a catalyst mixture (281) plus the temperature and pressure are maintained in an appropriate balance, the cycle of reformation, dehydration and hydrogenation continue to replicate. Furthermore, dehydration and hydrogenation are both self-sustaining steps because they are exothermic reactions.

An output (321) of second reactor (320), typically comprising short chain hydrocarbon radicals as well as substantially oxidized initiator (281), exits second reactor (320) at a temperature in excess of about 260° C. up to about 650° F. (340° C.) and a gauge pressure of about 4800 kPa (700 psig) after a residence time of about 10-12 minutes in the second reactor (320). The exothermic effect of dehydrogenation provides heat to be recycled to first reactor (310) to raise the temperature of slurry output (241) from storage tank (250).

Head-to-tail polymerization of short chain carbon radicals is understood to begin automatically in the third reactor (330) as temperature is raised up to about 700° F. to about 800° F. At this point in the reaction, initiator (281) is thought to have been converted to a sufficiently high oxidation state or fully oxidized to become inactive as to attack bonds to create free hydrogen as experienced in first reactor (310). However, oxidized initiator particles continue to provide surface sites for the polymerization of the short chain hydrocarbon radicals into hydrocarbons of selected lengths. The length of the carbon chain of the reformed polymers can be controlled by adjusting the residence time and temperature of third reactor (330). For example, to produce gasoline, shorter molecules of 6-12 carbon atoms are best. For diesel duel, 12-21 carbon molecules and for aircraft fuel, 15-19 carbon molecules are preferred. It is also preferred that at least about 80% of the produced combustible fuel contain about 6 to about 12 carbons per molecule, about 12 to about 21 carbons per molecule or about 15 to about 19 carbons per molecule.

It is within the skill of the art to adjust time, temperature and pressure in the three reactors to adjust the output as desired. In any event, for diesel fuel, polymerization in the about 700° F. to about 800° F. (370-425° C.) range; gasoline, about 800° F. to about 850° F. (425-455° C.) and kerosene, about 750° F. to about 850° F. (400-455° C.) should be acceptable. The polymerization takes place at a very high temperature. Dropping the temperature lowers and stops the rate of polymerization. Some copolymerization and branched polymerization can also occur. This can be enhanced by recycling the output. This leads to enhanced octane ratings.

Figure 4:
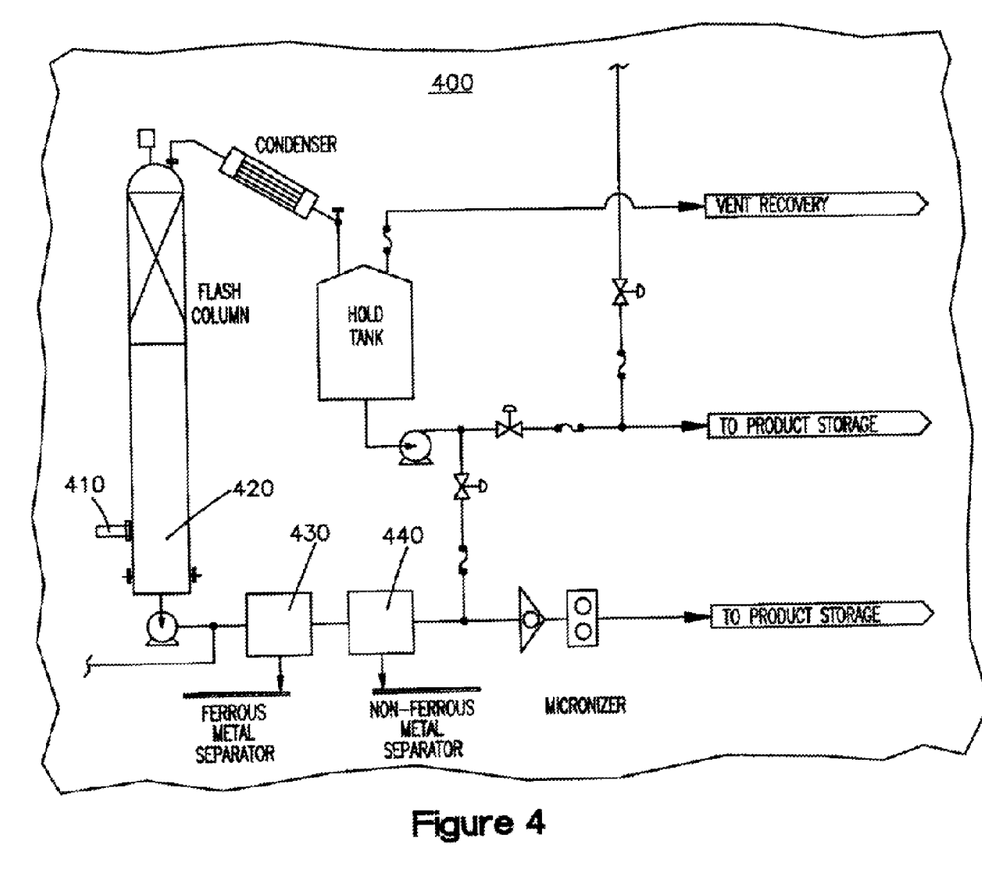
FIG. 4 is a schematic diagram of a finishing step of the method of FIG. 1.

When the desired polymerization has occurred, the content of the third reactor (330), a polymerized output (331), is fed into a flash column (420) shown more clearly as part of final section (400) in FIG. 4. Optionally, before the polymerized output (331) enters the flash column (410), a shock wave device (410) may be employed to use shock waves to break up long chain polymers into shorter chain polymers.

A shock wave device (410) operates at high temperatures and sends sonic waves to break up long molecular chains. Acceptable shock wave devices are available from Seepex, Inc. of Enon, Ohio. In the present invention, a shock wave device (410) helps break up any wax and other 25-30 carbon chain molecules into shorter chain molecules.

As the pressurized polymerized output (331) enters the flash column (420), the pressure is reduced from a gauge pressure of about 5500 kPa (800 psig) to a gauge pressure of about 1380 kPa (200 psig), while the temperature is lowered to about 400° F. (205° C.). The decrease in temperature ends polymerization. Within flash column (420), lighter carbon chains, such as those with fewer than 12 carbons, are understood to vaporize, and can be collected through a vent and can be condensed through a condenser (430) as a fuel source such as gasoline. In the production of diesel fuel, 6 to 8% of polymerized output (331) is understood to vaporize in flash column (420). Traces of carbon dioxide and carbon monoxide are also vented off at this time. They can be collected or processed, if it is desired, to reduce greenhouse emissions. Carbon chains with more than 12 carbons tend to stay in liquid phase and can be collected as a final output fuel (421). Final output fuel (421) can be recycled advantageously as input to liquid feed (270), where it can serve as the required non-aqueous hydrocarbon solvent.

Typically, the weight of final output fuel (421) recycled and the weight of solid feedstock (201) input into size reduction step (200) of method (10) should have about a 1:1 to a 1:2 ratio. Recycled final output fuel (421) acts as a heat source and provides catalyst mixture (281) to the feedstock stream.

The process described and claimed herein differs from the known Fischer-Tropsch process in certain key respects. The Fischer-Tropsch process starts with the combustion of a carbon-based organic compound in the presence of a supply of oxygen insufficient for a complete reaction, such that the combustion reaction produces principally carbon dioxide, carbon monoxide and hydrogen according to the general reaction:

The ratio of combustion products in that process is varied with operating conditions, catalyst and pressure. The carbon monoxide (CO) and hydrogen are then purified and reacted further over different catalysts to produce a variety of carbon chain length hydrocarbons and alcohols. Some ethers and acids may also be formed. The Fischer-Tropsch process is a gas phase chemistry process.

The method of the present invention is preferably carried out in liquid anaerobic conditions where no free oxygen or air is permitted except the naturally entrained air in the raw organic materials. The process can be carried out in organic liquid form and no combustion is permitted to occur. The three-step reaction involves converting the controlled moisture in the raw materials to a catalyst oxide and free hydrogen. In the second step of a mode of practicing the method the catalysts react with the oxygen in water, the cellulose and plastics to form a catalyst oxide and unsaturated carbon chains, which react with the in situ free hydrogen to form, saturated multiple carbon chain radicals. In the third step of a mode of practicing the method, the carbon chain radicals are reacted and polymerized to form iso, secondary and normal chains of controlled molecular weight. The three-step method can be carried out in continuous mode with different operating conditions for each step.

In a preferred embodiment, a ferrous metal separator (430) is utilized to remove and recycle catalyst mixture (281). Ferrous metal separator (430) may be assembled as a magnetic system that captures any iron or iron oxides in final output (421). A non-ferrous metal separator (440) is shown, but not required, for this invention. The collected iron particles may be reduced back to their metallic form to be reused in the invention again, or sold as scrap.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

Example 1

A synthetic diesel fuel was prepared in accordance with the method of the invention. First, a slurry was prepared using 30% by weight, based on the total weight of the slurry, of wood sawdust (less than 350 mesh; less than about 40 μm) in diesel. One pound of a catalyst mixture of Fe/$Fe_2O_3$ (weight ratio 70:30) was added for each 100 pounds of wood sawdust. The slurry was then fed to a series of nine screw press reactors. The starting temperature in the first three reactors was 250° F., the temperature in the second three reactors was 350° F., and the temperature in the last three reactors was 450° F. The pressure in the reactors was about 600 psi. A gaseous fraction was collected. The processed slurry was then sent through a filter press to separate the catalyst mixture from the liquid fuel product. The resulting fuel product met the ASTM diesel specification and it was determined that approximately 20% by volume, based on the total volume of the resulting fuel product, came from the biomass feedstock (wood sawdust).

Example 2

A synthetic diesel fuel was prepared in accordance with the method of the invention. First, a slurry was prepared using 25% by weight, based on the total weight of the slurry, of wood flour (less than 350 mesh; less than about 40 μm) in diesel. One and a half pounds of a catalyst mixture of Fe/$Fe_2O_3$ (70:30 weight ratio) was added for each 100 pounds of wood flour. The slurry was then fed to a series of nine screw press reactors at a pressure of about 600 psi. The starting temperature in the first three reactors was 240° F., the temperature in the second three reactors was 350° F. to 375° F., and the temperature in the last three reactors was 500° F. A gaseous fraction was collected and condensed and feed back into the series of reactors. The processed slurry was then sent through a filter press to separate the catalyst mixture from the liquid fuel product. The resulting fuel product met the ASTM diesel specification and it was determined that approximately 21% by volume, based on the total volume of the resulting fuel product, came from the biomass feedstock (wood flour).

While the preferred forms of the invention have been disclosed, it will be apparent to those skilled in the art that various changes and modifications may be made that will achieve some of the advantages of the invention without departing from the spirit and scope of the invention. Therefore, the scope of the invention is to be determined solely by the claims to be appended.

When ranges are used herein for physical properties, such as molecular weight, or chemical properties, such as chemical formulae, all combinations, and subcombinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A method for producing synthetic fuel, comprising:
    preparing a slurry comprising:
        a carbon-containing polymeric feedstock having a mean particle size of less than about 5 mm;
        a catalyst mixture having a mean particle size of less than about 1 mm comprising:
            elemental iron and $Fe_2O_3$; and
        a carrier liquid;
            wherein said elemental iron and said $Fe_2O_3$ are present in a weight ratio of about 90:10 to about 50:50; and
            wherein said carbon-containing polymeric feedstock and said catalyst mixture are present at a weight ratio of about 20:1 to about 200:1;
    heating said slurry to a temperature of about 20° C. to about 550° C. under a pressure of about 65 kPa to about 10,500 kPa for a time sufficient to produce a gaseous phase and a liquid phase; and
    condensing said gaseous phase to produce said synthetic fuel.

2. The method of claim 1, further comprising:
    recycling said catalyst mixture by recovering said catalyst mixture from said liquid phase and adding additional elemental iron to said catalyst mixture.

3. The method of claim 1, further comprising:
    recycling said carrier liquid by recovering said carrier liquid from said liquid phase.

4. The method of claim 1, further comprising:
    separating said gaseous phase from said liquid phase prior to said condensing step.

5. The method of claim 1,
    wherein said heating comprises heating to at least two different temperatures.

6. The method of claim 1,
wherein said temperature is about 40° C. to about 500° C.

7. The method of claim 1,
wherein said temperature is about 110° C. to about 265° C.

8. The method of claim 1,
wherein said pressure is about 3250 kPa to about 10,500 kPa.

9. The method of claim 1,
wherein said pressure is about 4000 kPa to about 4250 kPa.

10. The method of claim 1,
wherein said pressure is applied using at least one screw press.

11. The method of claim 1,
wherein said carbon-containing polymeric feedstock is lignocellulosic biomass.

12. The method of claim 1,
wherein said carbon-containing polymeric feedstock is a material selected from the group consisting of wood chips, wood fiber, sawdust, grass, hay, paper, cardboard, switch grass, agricultural waste, and mixtures thereof.

13. The method of claim 1,
wherein said elemental iron and said $Fe_2O_3$ are present in a weight ratio of about 70:30 to about 50:50.

14. The method of claim 1,
wherein said elemental iron and said $Fe_2O_3$ are present in a weight ratio of about 70:30.

15. The method of claim 1,
wherein said carrier liquid is a liquid selected from the group consisting of diesel, gasoline, aviation fuel, and mixtures thereof.

16. The method of claim 1,
wherein said carrier liquid is diesel.

17. The method of claim 1,
wherein said synthetic fuel comprises one carbon atom to about 20 carbon atoms per molecule.

18. The method of claim 1,
wherein said catalyst mixture has a mean particle size of less than about 0.2 mm.

19. The method of claim 1,
wherein said carbon-containing polymeric feedstock has a mean particle size of less than about 1 mm.

20. The method of claim 1,
wherein said carbon-containing polymeric feedstock has a mean particle size of less than about 0.1 mm.

21. A method for producing synthetic diesel, comprising:
preparing a slurry comprising:
  a carrier liquid;
  a carbon-containing polymeric feedstock having a mean particle size of less than about 5 mm; and
  a catalyst mixture having a mean particle size of less than about 1 mm comprising:
    elemental iron and $Fe_2O_3$;
  wherein said elemental iron and said $Fe_2O_3$ are present in a weight ratio of about 90:10 to about 50:50;
  wherein said carbon-containing polymeric feedstock and said catalyst mixture are present at a weight ratio of about 20:1 to about 200:1; and
  wherein said carbon-containing polymeric feedstock is present at a level of about 10% by weight to about 35% by weight, based on the total weight of the slurry;
heating said slurry to a temperature of about 20° C. to about 550° C. under a pressure of about 65 kPa to about 10,500 kPa for a time sufficient to produce a gaseous phase and a liquid phase; and
condensing said gaseous phase to produce said synthetic diesel.

22. The method of claim 1,
wherein said synthetic fuel is a fuel selected from the group consisting of diesel, gasoline, kerosene, home heating fuel, aviation fuel, and mixtures thereof.

23. The method of claim 21,
wherein said carbon-containing polymeric feedstock is present at a level of about 30% by weight to about 35% by weight, based on the total weight of said slurry.

* * * * *